US00RE37696E

(19) United States
(12) Reissued Patent
Parker

(10) Patent Number: US RE37,696 E
(45) Date of Reissued Patent: May 14, 2002

(54) WATER COOLER

(75) Inventor: Glen Leslie Parker, Industria (ZA)

(73) Assignee: URUS Industrial Corporation, Brantford (CA)

(21) Appl. No.: 09/164,391

(22) Filed: Sep. 30, 1998

Related U.S. Patent Documents

Reissue of:
(64) Patent No.: 5,560,211
Issued: Oct. 1, 1996
Appl. No.: 08/446,433
Filed: May 22, 1995

(30) Foreign Application Priority Data

May 22, 1995 (ZA) ..... 95/4161

(51) Int. Cl.[7] ..... F25B 21/02
(52) U.S. Cl. ..... 62/3.63; 62/3.64; 62/233; 62/349; 62/137
(58) Field of Search ..... 62/3.63, 3.64, 62/3.6, 349, 137, 139, 158, 233, 352, 157

(56) References Cited

U.S. PATENT DOCUMENTS

| | | | | |
|---|---|---|---|---|
| 1,969,187 A | * | 8/1934 | Schutt | 165/236 |
| 2,572,508 A | | 10/1951 | Muffly | |
| 3,008,299 A | | 11/1961 | Sheckler | |
| 3,088,289 A | * | 5/1963 | Alex | 62/3.64 |
| 3,250,433 A | | 5/1966 | Christine et al. | |
| 3,310,953 A | | 3/1967 | Rait | |
| 3,541,808 A | * | 11/1970 | Materese | 62/397 |
| 4,055,053 A | * | 10/1977 | Elfving | 62/3.63 |
| 4,364,234 A | | 12/1982 | Reed | |
| 4,461,153 A | * | 7/1984 | Lindner et al. | 62/3.2 |
| 4,497,179 A | * | 2/1985 | Iwans | 62/59 |
| 4,727,720 A | | 3/1988 | Wernicki | |
| 4,733,539 A | * | 3/1988 | Josten et al. | 62/233 |
| 4,822,996 A | * | 4/1989 | Lind | 62/137 |
| 4,866,945 A | | 9/1989 | Bender et al. | |
| 4,913,713 A | | 4/1990 | Bender et al. | |
| 4,958,505 A | | 9/1990 | Swanson | |
| 4,993,229 A | | 2/1991 | Baus et al. | |
| 4,996,847 A | | 3/1991 | Zickler | |
| 5,072,590 A | | 12/1991 | Burrows | |
| 5,163,298 A | * | 11/1992 | Hassell et al. | 62/59 |
| 5,367,879 A | * | 11/1994 | Doke et al. | 62/3.6 |
| 5,513,495 A | | 5/1996 | West et al. | |

FOREIGN PATENT DOCUMENTS

EP WO 93/08432 * 4/1993

* cited by examiner

*Primary Examiner*—William Doerrler
*Assistant Examiner*—Melvin Jones

(57) ABSTRACT

A water cooler having a container with a reservoir for storing water has a thermoelectric module operable to cool a conductor plate and form ice in the reservoir. A temperature sensor connected to the plate senses the temperature of the plate and activates a timer when the temperature is below the temperature at which water freezes. The timer operates a selected period of time to allow a block of ice to be formed on the plate. A photoelectric sensor operable to sense a selected size of the block of ice functions to actuate a switching device that changes the polarity of the electric power supplied to the thermoelectric module to supply heat energy to the plate to release the block of ice from the plate. The released block of ice floats in the water in the reservoir and cools the water.

30 Claims, 3 Drawing Sheets

WATER COOLER

Matter enclosed in heavy brackets [ ] appears in the original patent but forms no part of this reissue specification; matter printed in italics indicates the additions made by reissue.

FIELD OF THE INVENTION

This invention relates to thermoelectric water coolers operable to provide a source of cold drinking water. More particularly, the water cooler has a thermoelectric module operable to form ice used to cool water stored in a reservoir.

BACKGROUND OF THE INVENTION

Water coolers are known utilizing thermoelectric modules to freeze water in contact therewith to form ice in containers and using the ice to cool the remaining water in the containers. Usually the containers have a water supply connected thereto either from replenishable bottles or a water supply.

Examples of water coolers having thermoelectric modules to cool drinking water are disclosed by M. Alex in U.S. Pat. No. 3,088,289 and T. M. Elfving in U.S. Pat. No. 4,055,053. Elving's cooler produces ice which is intermittently released from the thermoelectric module into a water reservoir. The energy stored in the ice cools the water while more ice is formed by the thermoelectric module.

C. P. West and D. B. Neuwen describe in International Publication No. WO 93/08432, a water cooling system having a thermoelectric module to form ice used to cool water in a reservoir. A photo-optic sensing device is used to determine when ice produced on the thermoelectric module has a predetermined mass large enough to be released into the reservoir. The sensing device generates a light beam over the thermoelectric module. As the ice grows on the thermoelectric module, the light beam is broken, which causes the electric power supply to be turned OFF. Heat is allowed to flow from a heat sink through the thermoelectric module to defrost a part of the ice immediately adjacent the thermoelectric module. This allows the ice to float towards the surface of the water in the reservoir. As soon as the ice moves out of the light beam, the electric power is again supplied to the thermoelectric module to begin generation of the next mass of ice.

SUMMARY OF THE INVENTION

The invention is a water cooler for producing ice to cool water which is efficient in use and easy to maintain. The water cooler has a reservoir for storing water. An ice producing device is mounted on the container and is operable to selectively form ice and melt the ice to allow the ice to float in the water and thereby cool the water. The operation of the water cooler is controlled with the use of a temperature sensor for sensing the temperature of the ice producing device and causing a signal when the ice producing device has attained a selected temperature for forming ice. A timer responsive to the signal of the sensor causes the ice producing device to function for a selected period of time whereby a mass of ice grows on the ice producing device. A mass of ice is released from the ice producing device and allowed to float in the water in the reservoir thereby cooling the water.

A further feature of the water cooler is the use of a sensor for determining the presence of ice on the ice producing device to control the operation of the ice producing device to melt a portion of the ice to allow the ice to float in the water in the reservoir.

The preferred embodiment of the water cooler has a container with a reservoir for storing water. A valve attached to the container is used to withdraw water from the reservoir into a glass or cup. A thermoelectric module having a cool surface and a hot surface is located in a base below the container. A heat conductor, such as a plate, is mounted on the container for transferring heat energy between the water in the reservoir and the thermoelectric module. The heat conductor has a first surface in communication with the bottom of the reservoir and the water therein and a second surface located in engagement with the cold surface of the thermoelectric module. A heat sink, located below the thermoelectric module and adjacent the hot surface thereof, transfers heat from the thermoelectric module to the surrounding environment. The dissipation of the heat is facilitated by a motor driven fan which moves air across the heat sink. The thermoelectric module is connected to a source of electric power with a control. The temperature of the heat conductor is sensed with a thermocouple or other device which causes a signal when the heat conductor has attained a selected temperature sufficient to form ice, for example, about minus 8 degrees C. A timer responsive to the sensed temperature signal maintains a supply of electric power to the thermoelectric module for a selected period of time, for example, 40 minutes, to allow a mass of ice to form on the conductor. A photoelectric sensor is located above the conductor for detecting the presence of a mass of ice when the mass of ice reaches a selected size. A control reverses the polarity of the electric power of the thermoelectric module when the sensor detects the presence of the selected size of the mass of ice whereby heat energy is transferred to the conductor causing a part of the mass of ice to melt adjacent the conductor. This allows the remaining mass of ice to float in the water and the reservoir and cool the water.

The invention includes a method of cooling water with ice in a container having a reservoir for storing water. The ice is formed by the operation of a thermoelectric module or component located adjacent a member for conducting heat energy between the water in the reservoir and the thermoelectric module. The thermoelectric module operates in response to electric power having opposite polarities which are selectively applied to the thermoelectric module. The member is cooled by the thermoelectric module energized with electric power having a first polarity. The temperature of the member is sensed with a temperature sensing device which records when the temperature is below the temperature at which water freezes, for example, minus 8 degrees C. The supply of electric power having the first polarity to the thermoelectric module to maintain the sensed temperature of the member at the temperature below the temperature at which water freezes for a selected period of time, for example, 40 minutes, to form a block of ice adjacent the member from the water in the reservoir. A timer, responsive to the temperature sensing device, operates to provide the selected period of time that the electric power is supplied to the thermoelectric module. When a selected size of the block of ice formed adjacent the plate is sensed with a photo optical sensor, the polarity of the electric power to the thermoelectric module is reversed to a second polarity thereby causing the thermoelectric module to heat the member to a temperature that melts a portion of the ice adjacent the member. This allows the remaining block of ice to free itself from the member and float in the water in the reservoir to cool the water. The polarity of the electric power supplied to the thermoelectric module is changed from the second polarity back to the first polarity when the block of ice is not sensed in the reservoir whereby the thermoelectric module operates to cool the member to form another block of ice.

DETAILED DESCRIPTION OF THE PREFERRED EMBODIMENT

Figure 1:
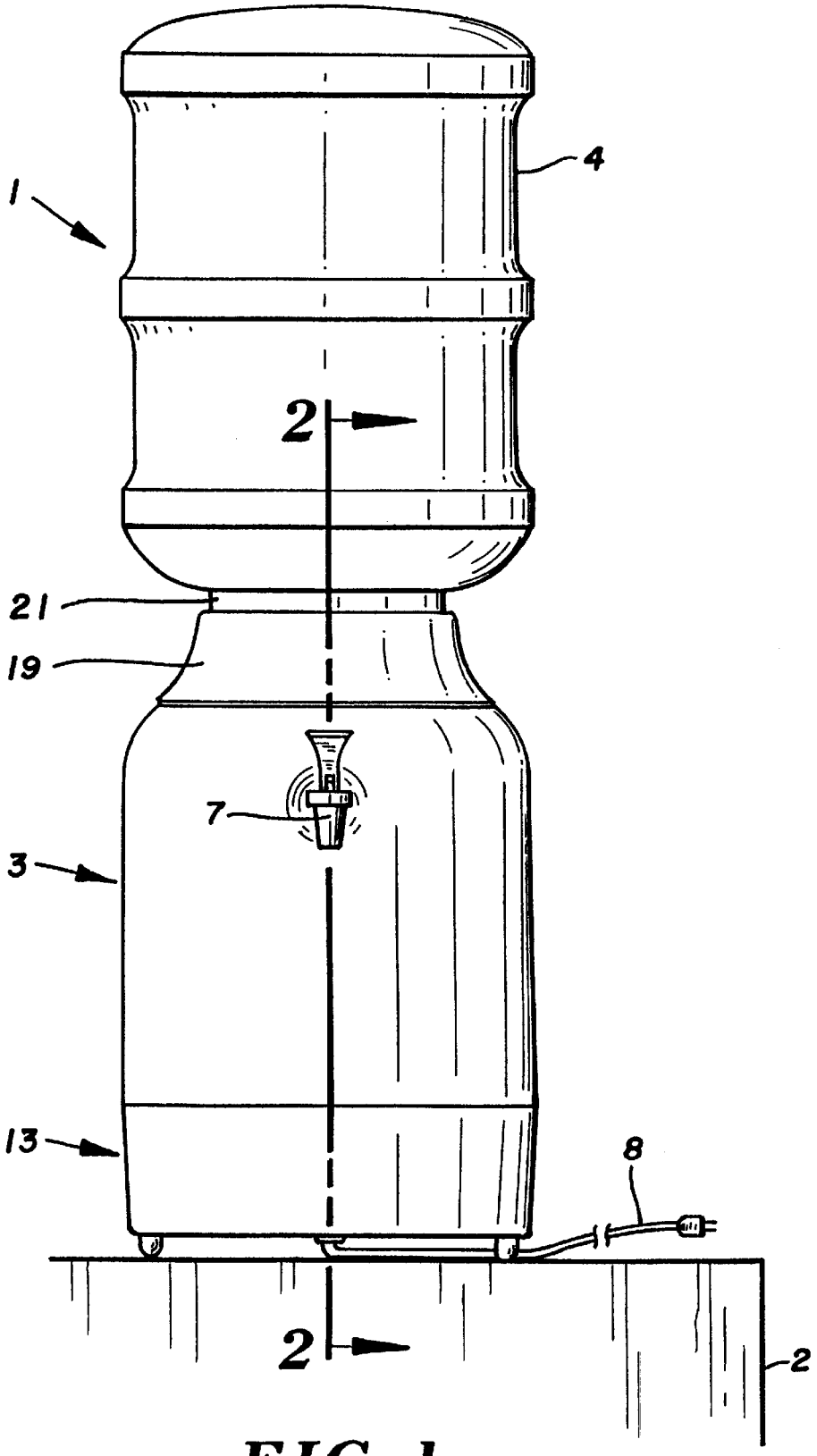
FIG. 1 is a front elevational view of a water cooler of the invention supporting an inverted bottle having a supply of water.

Referring to FIG. 1, there is shown the water cooler, indicated generally at 1, of the invention operable to provide a source of cool drinking water for human consumption. Water cooler 1 is retained in an upright position on a support 2, such as a table or counter. Cooler 1 has a generally cylindrical container 3 having an internal chamber or water reservoir 17 for storing a supply of water. An annular top 19, mounted on top of container 3, has a ring 21 supporting an inverted bottle 4 having a supply of water in communication with the water in reservoir 17. Bottle 4 is a conventional water storage bottle having a neck 24 with an opening to allow water to flow out of the bottle. Top 19 can be removed from container 3 to permit cleaning of the inside of container 3.

Figure 2:
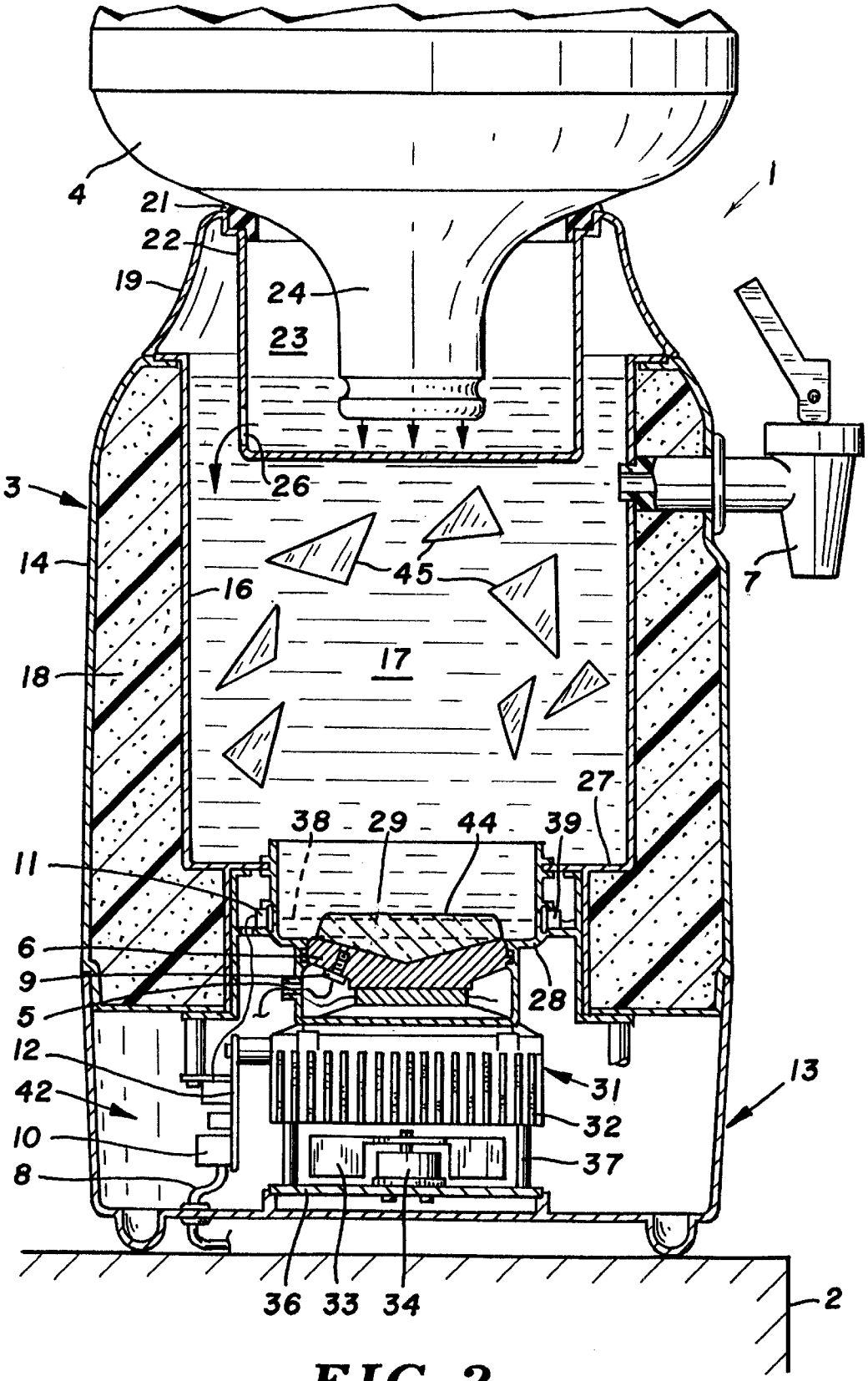
FIG. 2 is a view partly sectioned, taken along the line 2—2 of FIG. 1.

Referring to FIG. 2, container 3 has a cylindrical outer wall 14 surrounding an inner cylindrical wall 16. A core 18 of temperature insulation material, such as foam polystyrene, is interposed between walls 14 and 16 to maintain the cool temperature of the water in reservoir 17. Other types of wall structures can be used for container 3. Wall 16 surrounds reservoir 17. Top 19 is supported on the top of container 3. Top 19 has a cup-shaped member 22 that projects downwardly into reservoir 17 and surrounds a chamber 23 accommodating neck 24 of bottle 4. Member 22 has at least one passage 26 to allow water to flow from chamber 23 into reservoir 17.

Member 22 is an ice dispensing structure which aids in dispensing the blocks of ice 45 floating in the water in reservoir 17. Member 22 also prevents the ice blocks from flowing into bottle 4 or blocking the opening in neck 24 of bottle 4. A manually-operated valve 7, mounted on container 3, is open to reservoir 17 to allow a person to operate valve 7 and obtain cool water from reservoir 17. When the level of water drops below the bottom of neck 24, air will flow up into bottle 4 and allow water to flow from bottle 4 into chamber 23. The water will continue to flow into chamber 23 and reservoir 17 until the level of the water is above the bottom of neck 24.

An annular bottom wall 27 joined to the lower portion of side wall 16 supports and upwardly-open cup member 28 forming a pocket 29. The bottom of pocket 29 is closed with a heat conductor or metal plate 6, such as an aluminum plate or other heat conducting materials. Plate 6 has a downwardly-directed cone-shaped top surface providing the bottom of product 29 which is exposed to the water in pocket 29. The bottom of plate 6 has a flat bottom surface in contact with a thermoelectric module 5. Module 5 is an ice producing device comprising semiconductor structure having opposite hot and cold sides or surfaces when coupled to an electric power source. The hot and cold temperature characteristics of the opposite surfaces alternate with the polarity of the electric power applied to module 5 is reversed. The thermoelectric module 5 is a common electrical component in the art of cooling water and air. The lower surface of module 5 is located in contact with a heat sink, indicated generally at 31, for transferring heat from module 5 to the surrounding environment. Heat sink 31 has a plurality of downwardly-directed fins 33 located above a rotatable fan 33. An electric motor 34 is operable to rotate fan 33 to circulate air through fins 32 to dissipate the heat conducted to fins 35 to the air moved by fan 33. Motor 34 is supported on a horizontal plate 36. A plurality of upwardly-directed posts or rods 37 support the heat sinks 31 on plate 6.

A photo-optical device 11 mounted on one side of cup member 28 is operable to generate a light beam 38 toward a sensor 39 located on opposite sides of cup member 28. The photo-optical device 11, in conjunction with sensor 39 is operable to sense the level of ice in pocket 29. When the ice breaks the light beam 38, the control circuit as hereinafter described, functions to reverse the plurality of electrical power through thermoelectric module 5 thereby heating plate 6, which in turn will melt part of the ice to release the ice from pocket 29. Ice, indicated at ice 45, floats to the upper portion of reservoir 17 and cools the water.

Figure 3:
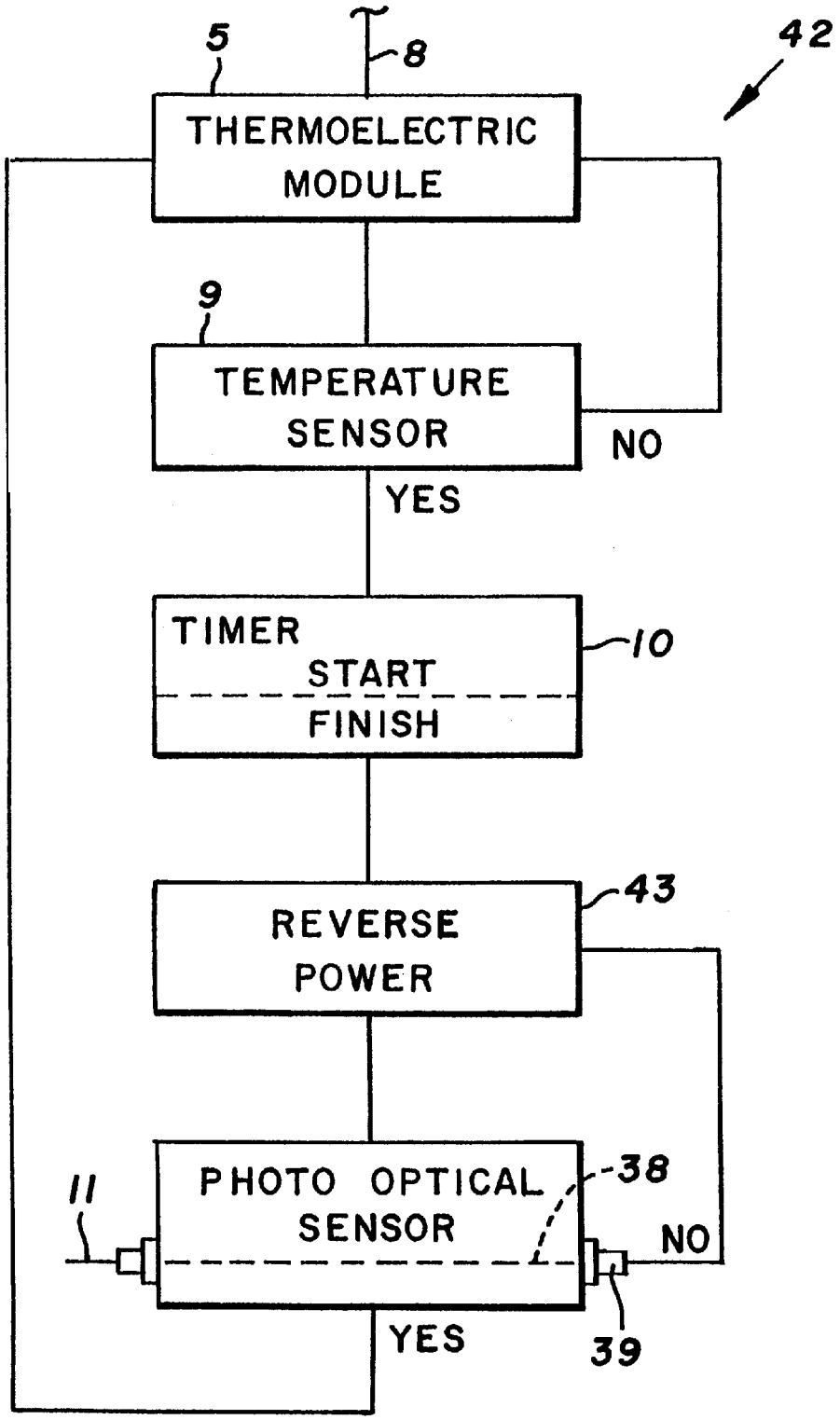
FIG. 3 is a logic diagram of the electric control system for the water cooler.

Referring to FIG. 3, there is shown a logic diagram for a control circuit or controller 42, which automatically regulates the operation of the water cooler 1. Controller 42 is mounted on a circuit board 12 located within base 13. Electric cord or cable 8 is used to connect controller 42 with a source of electric power, such as the conventional 110 volt A.C. power. Electric power is supplied from an external source via cord 8 to thermoelectric module 5. A temperature sensor 9 mounted directly on plate 6, as seen in FIG. 2, is operable to record a predetermined temperature, usually at about minus 8 degrees C. Sensor 9 is a thermocouple threaded into a blind hole in plate 6. Sensor 9 can be secured to the side or bottom of plate 6 or attached to structure adjacent plate 6. Other types of temperature sensing devices, such as bimetal switches, can be used in association with plate 6 to sense the temperature of plate 6 and provide a signal for actuating the timer 10. When plate 6 has reached the predetermined temperature, the temperature sensor 9 causes a signal to initiate operation of timer 10. Timer 10 is an electric component located on circuit board 12 used to actuate electric power switching component or device 43 to reverse the polarity of the electric power supplied to thermoelectric module 5. The timer 10 is operable for a specific period of time, for example, 40 minutes. At the end of a predetermined time, a block or mass of ice will be formed on top of plate 6 in pocket 29. The end of the time period is used to initiate a switching device 43 to reverse the polarity of the electrical supply to thermoelectric module 5. The reversing of the polarity of the electrical supply to thermoelectric module 5 causes plate 6 to heat up plate 6 and thereby melt a layer of ice on plate 6 which will release the block of ice from the top of plate 6. The ice 44 will flow to the top of reservoir 17 and cool the water. The floating block of ice are shown at 45 in FIG. 2.

The photo-optical sensor 11 generates a light beam 38 which senses the presence of a mass of ice 44 having a selected size in pocket 29 when the light beam is broken or prevented from actuating sensor 39. The photo-optical sensor 11 is energized on the reversal of the plurality of the electrical power supply to thermoelectric module 5 when the ice block 44 flats away from plate 6 and will only provide an output signal when there is no ice present in pocket 29 and when the level of the ice is below light beam 38. A signal from the photo optical sensor 11, 39 is used to reset the circuitry back to its original state with the power supplied to cool plate 6 whereby a second mass of ice is formed on plate 6. Photo-optical sensor 11, 19 and timing device 10, determine the size of the ice block which is allowed to form on plate 6. Other types of sensor, including, but not limited to, sonic wave sensors, can be used to determine the size of the ice block.

The use of the photo-optical sensor 11, 39 will prevent too much ice collecting in reservoir 17 and prevent release of ice block 44 from plate 6. Should the ice pack in reservoir 17 prevent the newest ice block from floating away from plate 6, the power will remain in the condition causing heating of plate 6 until it is switched off after a predetermined time. When sufficient ice has been melted or has been removed from reservoir 17, the photo-optical sensor 11, 39 to reset the circuitry for normal operation of water cooler 1.

The water cooler may be modified from the specific example shown without departing from the scope of the invention. The control circuits can be modified and the ice sensor may be of any convenient kind. The water cooler may be made so that a mixture of cold and supply water is dispensed. Various alterations, modifications and changes in the materials, structures and arrangement of structure may be made in the preferred embodiment herein described without departing from the scope of the invention as defined in the following claims.

I claim:

1. A water cooler for producing ice to cool water comprising: a container having a side wall and bottom wall providing a reservoir for storing water, a cup-shaped member mounted on the bottom wall, said cup-shaped member having a bottom wall and an upper end open to the reservoir whereby the cup-shaped member accommodates water, a heat conducting member mounted on the bottom wall of the cup-shaped member, said heat conducting member having a top surface exposed to the water in the cup-shaped member and a bottom surface spaced from the top surface, a thermoelectric module having a first surface located in engagement with the bottom surface of the heat conducting member and a second surface spaced from the first surface, control means operably connected to the thermoelectric module for reversing the polarity of electric power supplied to the thermoelectric module whereby when a first polarity of electric power is supplied to the thermoelectric module the first surface is cooled, thereby cooling the heat conducting member to form ice adjacent the top surface of the heat conducting member and when a second polarity opposite the first polarity is supplied to the thermoelectric module the first surface is heated thereby heating the heat conducting member to melt ice adjacent the top surface of the heat conducting member to allow the remaining ice to float in the water in the reservoir, said control means including means for sensing the temperature of the heat conducting member and causing a signal when the heat conducting member has attained a selected temperature for forming ice, timer means responsive to said signal causing the electric power supplied to the thermoelectric modules to have a first polarity for a selected period of time whereby a block of ice is produced adjacent the top surface of the heat conducting member said timer means being operable after a selected period of time to change the polarity of the electric power to the second polarity thereby heating the heat conducting member to partly melt the ice adjacent the heat conducting member allowing the remaining ice to float in the water in the reservoir and cool the water in the reservoir, sensing means for sensing the size of the block of ice formed on the heat conducting member, said sensing means including a photo optical sensor mounted on the cup-shaped member for generating a light beam located above the heat conducting member and projected across the water in the cup-shaped member, said light beam being broken by a block of ice of a selected size, said control means including means responsive to the broken light beam to change the polarity of the electric power to the second polarity prior to the selected period of time established by the timer means thereby heating the heat conducting member allowing the remaining ice to float in the water in the reservoir and cool the water in the reservoir.

2. The water cooler of claim 1 including a heat sink located adjacent the second surface of the thermoelectric module.

3. The water cooler of claim 1 wherein: the means for sensing the temperature of the heat conducting member includes a thermocouple mounted on the heat conducting member, said thermocouple being operable to cause said signal when the heat conducting member is at a temperature that is below the freezing temperature of water.

4. A water cooler for producing ice to cool water comprising: a container having a reservoir for storing water, means mounted on the container for removing water from the reservoir, a thermoelectric module having a first surface and a second surface, plate means of heat conductive material mounted on the container for transferring heat energy between the water in the reservoir and the first surface of the thermoelectric module, said plate means having a top surface in communication with the bottom of the reservoir and the water therein and a bottom surface located in engagement with the first surface of the thermoelectric module, a heat sink located adjacent the second surface of the thermoelectric module for transferring heat to the surrounding environment, control means connecting the thermoelectric module to a source of electric power having a first and second polarity whereby the thermoelectric module cools the plate means when connected to the source of electric power having the first polarity thereby causing a block of ice to form adjacent the surface of the plate means, means for sensing the temperature of the plate means and causing a signal when the plate means has attained a selected temperature for forming ice, timer means responsive to said signal for maintaining the supply of electric power having said first polarity to the thermoelectric module for a selected period of time whereby a block of ice is formed adjacent the plate means, said timer means being operable after the selected period of time to change the polarity of the electric power from the first polarity to the second polarity whereby heat energy is transferred from the thermoelectric module to the plate means causing a part of the block of ice to melt adjacent the plate means so that the remaining block of ice floats in the water in the reservoir, sensing means located above the plate means for detecting the presence of the block of the ice when the block of ice reaches a selected size, and control means for reversing the polarity of the electric power from the first polarity to the second polarity to the thermoelectric module prior to the end of the selected period of time of the timer means when the sensing means detects the presence of the selected size of the block of ice whereby heat energy is transferred to the plate means causing a part of said block of ice to melt adjacent the plate means thereby allowing the remaining block of ice to float in the water in said reservoir and cool the water.

5. The water cooler of claim 4 wherein: the plate means is a metal member, said means for sensing the temperature of the plate means being mounted on the metal member.

6. The water cooler of claim 5 wherein: the means for sensing the temperature of the plate means includes a thermocouple mounted on the metal member, said thermocouple being operable to cause said signal when the metal member is at a temperature that is below the freezing temperature of water.

7. The water cooler of claim 4 wherein: the sensing means is a photo optical sensor generating a light beam above the plate means, said light beam being broken by the selected size of the block of ice, and said control means being responsive to said broken light beam to reverse the polarity of the electric power to the thermoelectric module from the first polarity to the second polarity and change the polarity of the electric power from the second polarity to the first polarity when the light beam is continuous.

8. The water cooler of claim 4 including: a cup member located at the bottom of the reservoir having a pocket for accommodating water, said plate means being located in the bottom of the cup member whereby ice is formed in said pocket, said means for sensing the temperature of the plate means being connected to the plate means, and said sensing means for detecting the presence of the block of ice being operable to detect the level of ice formed in said pocket.

9. The water cooler of claim 8 wherein: the means for sensing the temperature of the plate means includes a thermocouple being operable to cause said signal when the plate means is at a temperature that is below the freezing temperature of the water.

10. A method of cooling water in a container having a reservoir for storing water with a thermoelectric module located adjacent a member for conducting heat energy between the water in the reservoir and the thermoelectric module comprising: storing water in the reservoir, cooling the member with the thermoelectric module by supplying electric power having a first polarity to the thermoelectric module, sensing the temperature of the member, maintaining the supply of electric power having the first polarity to the thermoelectric module to maintain the sensed temperature of the member at a temperature below the temperature at which water freezes for a selected period of time to form a block of ice adjacent the member from the water in the reservoir, sensing the size of the block of ice in the reservoir formed adjacent the member, reversing the polarity of the electric power supplied to the thermoelectric module to a second polarity when a selected size of the block of ice is sensed before the end of the selected period of time that the supply of electric power is maintained having the first polarity to the thermoelectric modular thereby causing the thermoelectric module to heat the member to a temperature that melts a portion of the block of ice adjacent the member so as to allow the remaining block of ice to float in the water in the reservoir, and changing the polarity of the electric power supplied to the thermoelectric module from the second polarity back to the first polarity when a block of ice is not sensed in the reservoir whereby the thermoelectric module operates to cool the member to form another block of ice.

11. The method of claim 10 wherein: the supply of electric power having the first polarity to the thermoelectric module is commenced for the selected period of time when the sensed temperature is at least minus 8 degrees C.

12. The method of claim 11 wherein: the electric power supplied to the thermoelectric module is maintained for at least 40 minutes.

13. The method of claim 10 wherein: the maintaining of the electric power supply having the first polarity to the thermoelectric module is achieved with a timer which commences operation for the selected period of time in response to sensed temperatures below the temperature at which water freezes.

14. The method of claim 10 wherein: the sensing of the temperature of the member is accomplished with a temperature sensing device secured to the member.

15. The method of claim 10 wherein: the maintaining of the electric power supply having the first polarity of the thermoelectric module is achieved with a timer which commences operation for the selected period of time in response to a sensed temperature which is below the temperature at which water freezes, and the sensing of the temperature of the member is accomplished with a temperature sensing device.

16. The water cooler of claim 4 wherein: the means for sensing the temperature of the plate means is set to sense a temperature of about minus 8 degrees C. on the plate means.

17. A water cooler comprising: a container having a reservoir for storing water, heat conductor means mounted on the container having a first surface in contact with the water located in the reservoir and a second surface spaced from the first surface, a thermoelectric module engageable with the second surface for selectively cooling and heating the heat conductor means to form ice adjacent the first surface of the thermoelectric module and melt part of the ice adjacent the first surface of the thermoelectric to allow the remaining ice to float in the water in the reservoir, control means connecting the thermoelectric module to a source of electric power having a first and second polarity whereby the thermoelectric module cools the heat conductor means when the electric power has the first polarity, timer means for maintaining the supply of electric power having said first polarity to the thermoelectric module for a selected period of time whereby a block of ice is formed adjacent the first surface of the heat conductor means, said timer means being operable after the selected period of time to change the polarity of the electric power from the first polarity to the second polarity whereby heat energy is transferred from the thermoelectric module to the heat conductor means causing part of the block of ice to melt adjacent the first surface of the heat conductor means so that the remaining block of ice floats in the water in the reservoir, sensing means spaced from the conductor means for detecting the presence of the block of ice when the block of ice reaches a selected size, and control means for reversing the polarity of the electric power from the first polarity to the second polarity to the thermoelectric module prior to the end of the selected period of time of the timer means when the sensing means detects the presence of the selected size of the block of ice whereby heat energy is transferred to the heat conductor means causing a part of said block of ice to melt adjacent the heat conductor means thereby allowing the remaining block of ice to float in the water in said reservoir and cool the water.

18. The water cooler of claim 17 including: means for sensing the temperature of the heat conductor means and causing a signal when the heat conductor means has attained a selected temperature for forming ice adjacent the heat conductor means, said signal being operable to actuate the timer means to connect the source of electric power having the first polarity to the thermoelectric module thereby commencing the selected period of time of operation of the timer means.

19. The water cooler of claim 18 wherein: the means for sensing the temperature of the heat conductor means is set to sense a temperature of about minus 8 degrees C. on the heat conductor means.

20. The water cooler of claim 18 wherein: the means for sensing the temperature of the heat conductor means includes a thermocouple mounted on the heat conductor means, said thermocouple being operable to cause said signal when the heat conductor means is at a temperature that is below the freezing temperature of water.

21. The water cooler of claim 17 wherein: the sensing means is a photo optical sensor generating a light beam spaced from the heat conductor means, said light beam being broken by the selected size of the block of ice, and said control means being responsive to said broken light beam to reverse the polarity of the electric power to the thermoelectric module from the first polarity to the second polarity and change the polarity of the electric power from the second polarity to the first polarity when the light beam is continuous.

22. The water cooler of claim 17 including: a cup member located at the bottom of the reservoir having a pocket for accommodating water, said heat conductor means being located in the bottom of the cup member whereby ice is formed in said pocket, and said sensing means for detecting the presence of the block of ice being operable to detect the level of the block of ice formed in said pocket.

*23. A water cooler comprising: a container having a reservoir for storing water, heat conductor means mounted on the container having a first surface in contact with the water located in the reservoir and a second surface spaced from the first surface located outside of the resevoir, a thermoelectric module engageable with the heat conductor means for selectively cooling and heating the heat conductor means to selectively form ice adjacent the first surface of the thermoelectric module and melt part of the ice adjacent the first surface of the thermoelectric module to allow the remaining ice to float in the water in the reservoir, control means connecting the thermoelectric module to a source of electric power having a first and second polarity whereby the thermoelectric module cools the heat conductor means when the electric power has the first polarity, said control means being operable to reverse the polarity of the electric power from the first polarity to the second polarity and from the second polarity back to the first polarity, temperature sensing means mounted on the heat conductor means for providing a first signal indicating that the temperature of the first surface of the heat conducting means is below the freezing temperature of water, timer means actuated by the first signal for maintaining the supply of electric power having said first polarity to the thermoelectric module for a selected period of time whereby a block of ice is formed adjacent the first surface of the heat conductor means, said timer means being operably connected to the control means and temperature sensing means whereby the first signal from the temperature sensing means actuates the temperature sensing means and control means after the selected period of time to change the polarity of the electric power from the first polarity to the second polarity so that heat energy is transferred from the thermoelectric module to the heat conductor means causing part of the block of ice to melt adjacent the first surface of the heat conductor means so that the remaining block of ice floats in the water in the reservoir, sensing means spaced from the heat conductor means for detecting the presence of the block of ice in the reservoir when the block of ice reaches a selected size, said sensing means operative connected to the control means providing a second signal when there is no ice is detected to cause said control means to reset the electric power polarity from the second polarity back to the first polarity and the timer means.*

*24. The water cooler of claim 23 wherein: the temperature sensing means includes a thermocouple mounted on the heat conductor means, said thermocouple being operable to cause said first signal when the heat conductor means is at a temperature that is below the freezing temperature of water.*

*25. A water cooler comprising: a container having a bottom wall and a reservoir for storing water, an ice forming unit mounted on the bottom wall for making ice in the reservoir, means for operating the ice forming unit, a temperature sensing device mounted on the ice forming unit causing a signal when the ice forming unit has attained a selected temperature for forming ice in said reservoir, timing means for actuating the means for operating the ice forming unit for a selected period of time whereby ice is formed in the reservoir adjacent the ice forming unit, said timing means being connected to the temperature sensing device and operable in response to said signal indicating that the ice forming unit has attained the selected temperature for forming ice in said reservoir.*

*26. The water cooler of claim 25 wherein: the ice forming unit is a thermoelectric module and the temperature sensing device is a thermocouple.*

*27. The water cooler of claim 25 including: a sensor to determine the presence of ice in the reservoir above a predetermined thickness, said sensor generating a signal when ice is not present adjacent the sensor, said signal activating the means for operating the ice forming unit and timing means actuated by the signal from the temperature sensing device.*

*28. The water cooler of claim 27 wherein: the sensor is an electrical photo-optical device.*

*29. The water cooler of claim 25 wherein: the ice forming unit is a thermoelectric module and the means for operating the ice forming unit includes an electric power supply having a polarity reversing a device operable connected to the thermoelectric module.*

*30. The water cooler of claim 25 including: a sensor to determine the presence of ice in the reservoir above a predetermined thickness, said sensor generating a no ice signal when ice is not present adjacent the sensor, said no ice signal activating the means for operating the ice forming unit, the ice forming unit is a thermoelectric module and the means for operating the ice forming unit includes an electric power supply having a polarity reversing device operably connected to the thermoelectric module.*

* * * * *